(12) United States Patent
Swander et al.

(10) Patent No.: US 8,289,970 B2
(45) Date of Patent: Oct. 16, 2012

(54) IPSEC ENCAPSULATION MODE

(75) Inventors: Brian D. Swander, Bellevue, WA (US); Daniel R. Simon, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 12/505,074

(22) Filed: Jul. 17, 2009

(65) Prior Publication Data

US 2011/0013634 A1    Jan. 20, 2011

(51) Int. Cl.
*H04L 12/28*  (2006.01)
*H04L 12/56*  (2006.01)
*H04L 29/06*  (2006.01)
*G06F 9/00*   (2006.01)
*G06F 15/16*  (2006.01)
*G06F 17/00*  (2006.01)

(52) U.S. Cl. ........ 370/395.2; 370/401; 726/14; 713/161
(58) Field of Classification Search .................. 713/161, 713/153, 170; 726/14, 15, 11, 13; 380/30; 370/395.2, 401
See application file for complete search history.

(56) References Cited

U.S. PATENT DOCUMENTS

| | | | |
|---|---|---|---|
| 6,795,917 B1 | 9/2004 | Ylonen | |
| 6,915,437 B2 | 7/2005 | Swander et al. | |
| 6,978,308 B2 * | 12/2005 | Boden et al. ................. | 709/229 |
| 7,046,647 B2 | 5/2006 | Oba et al. | |
| 7,174,565 B2 | 2/2007 | Kadyk et al. | |
| 7,362,780 B2 | 4/2008 | Liu | |
| 7,500,102 B2 * | 3/2009 | Swander et al. .............. | 713/171 |
| 7,516,485 B1 * | 4/2009 | Lee et al. ........................ | 726/11 |
| 2001/0009025 A1 * | 7/2001 | Ahonen ........................ | 713/161 |
| 2002/0178361 A1 * | 11/2002 | Genty et al. .................. | 713/175 |
| 2004/0083360 A1 | 4/2004 | Walsh et al. | |
| 2005/0273595 A1 * | 12/2005 | Ogawa et al. ................. | 713/153 |
| 2007/0169187 A1 * | 7/2007 | Balissat et al. .................. | 726/15 |
| 2007/0180227 A1 * | 8/2007 | Akimoto ....................... | 713/153 |
| 2008/0044012 A1 * | 2/2008 | Ekberg et al. .................. | 380/30 |
| 2008/0195865 A1 * | 8/2008 | Nikander ...................... | 713/170 |
| 2008/0244728 A1 * | 10/2008 | Terasoma ........................ | 726/14 |
| 2010/0011375 A1 * | 1/2010 | Kivinen ........................ | 719/313 |
| 2010/0284400 A1 * | 11/2010 | Melen et al. .................. | 370/389 |
| 2011/0013634 A1 * | 1/2011 | Swander et al. ............. | 370/394 |
| 2011/0107104 A1 * | 5/2011 | Zhang et al. .................. | 713/171 |

OTHER PUBLICATIONS

Glenn et al. , "The NULL Encryption Algorithm and Its Use with IPsec", Network Working Group, Nov. 1998, 5 pgs. http://www.securitytechnet.com/resource/ietf/rfc/rfc2410.pdf.
Grewal et al. "XESP for Traffic Visibility", Internet Engineering Task Force, Jun. 23, 2008, 11 pgs. http://tools.ietf.org/html/draft-grewal-ipsec-traffic-visibility-01.
NAT Compatible IPSec, 2 pgs., http://publib.boulder.ibm.com/iseries/v5r2/ic2924/index.htm?info/rzaja/rzajaudpencap.htm.
NAT Traversal, Wikipedia, 3 pgs., http://en.wikipedia.org/wiki/NAT_traversal. The IPsec Protocols, 18 pgs. http://www.freeswan.org/freeswan_trees/freeswan-1.99/doc/ipsec.html.
Spreng et al. "Implementation of an Authentication and Authorization Architecture for Mobile Internet Users", 7 pages. http://www.iam.unibe.ch/~rvs/research/pub_files/SBSW06.pdf.

* cited by examiner

*Primary Examiner* — Ayaz Sheikh
*Assistant Examiner* — Hoang-Chuong Vu
(74) *Attorney, Agent, or Firm* — Merchant & Gould P.C.

(57) ABSTRACT

Described are embodiments directed to negotiating an encapsulation mode between an initiator and a responder. As part of the negotiation of the security association, an encapsulation mode is negotiated that allows packets to be sent between the initiator and responder without encapsulation. The ability to send packets without encapsulation allows intermediaries, such as a firewall, at the responder to easily inspect the packets and implement additional features such as security filtering.

19 Claims, 5 Drawing Sheets

IPSEC ENCAPSULATION MODE

BACKGROUND

The Internet because of its open nature provides opportunities for malicious users to tamper with computers and messages exchanged between computers. There are thus security protocols that have been created to try to address some of these security concerns. For example, IPSec is a set of security protocols that have been established for authenticating two computers before they exchange messages and for securing the integrity of messages that are exchanged between the computers.

A consequence of providing additional security to messages exchanged over a network, such as implementing IPSec, is that the format of the messages is changed, e.g., encapsulated. IPSec for example encapsulates messages resulting in changes to a messages headers and trailers. The changes made to the messages complicate some deployment features of intermediaries such as firewalls. In some instances, IPSec prevents the implementation of some security features by a firewall such as message filtering.

It is with respect to these and other considerations that the embodiments described herein have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Described are embodiments directed to negotiating an encapsulation mode between an initiator and a responder. In embodiments, an initiator and a responder negotiate a security association for securely sending packets between the two. As part of the negotiation of the security association, an encapsulation mode is negotiated that allows packets to be sent between the initiator and responder without encapsulation. The ability to send packets without encapsulation allows intermediaries, such as a firewall to easily inspect the packets and implement additional features such as security filtering. Accordingly, embodiments enable the establishment of a security association between the initiator and responder yet allow intermediaries to easily implement additional features.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the subject matter to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
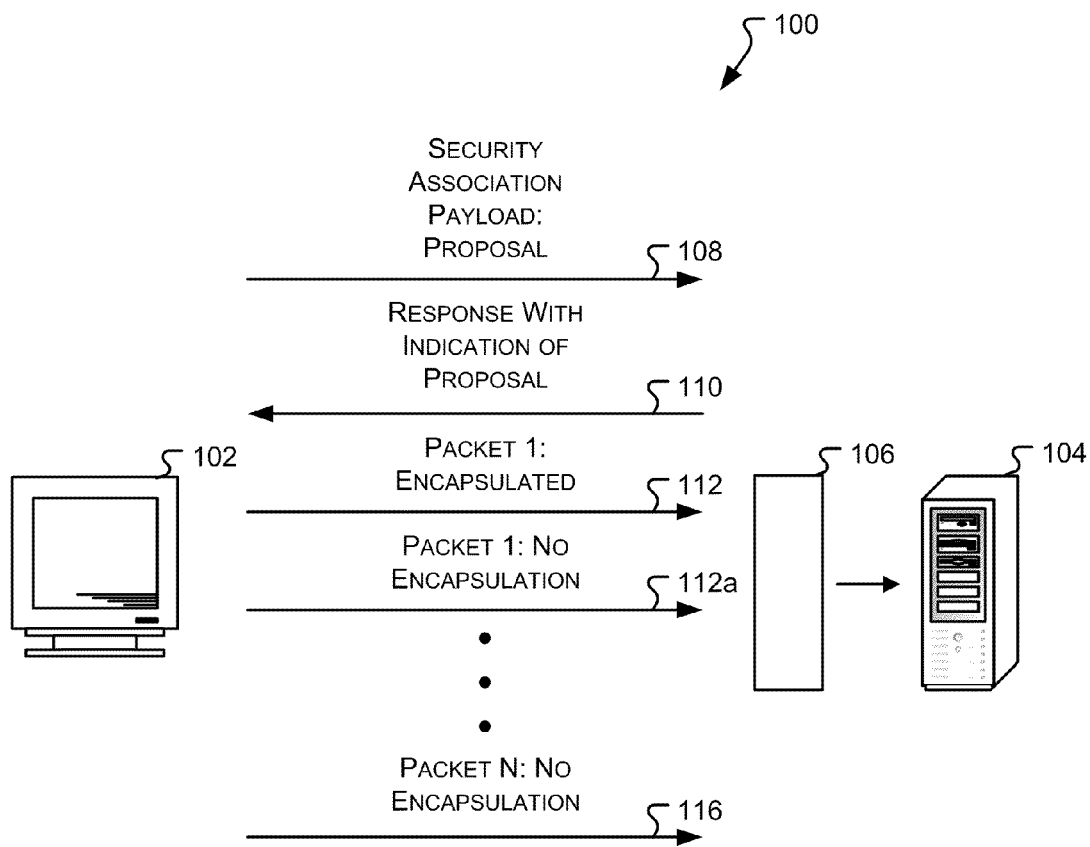
FIG. 1 illustrates a system including an initiator and a responder that negotiate an encapsulation mode, according to an embodiment.

FIG. 1 illustrates a system 100, according to an embodiment of negotiating an encapsulation mode for sending messages between two computers. System 100 includes an initiator 102, a responder 104, and an intermediary 106. In embodiments, initiator 102 is a client computer that can connect to the responder 104, which is a server computer. The intermediary 106 provides additional features such as security, gathering of statistics, and general monitoring of packets sent and received by responder 104. In some embodiments, the initiator 102 and responder 104 are part of a wide-area network (WAN) such as the Internet, wherein in other embodiments they are part of a local area network (LAN).

In accordance with embodiments, initiator 102 and responder 104 can negotiate security for securely sending packets between each other, and as part of the negotiation, also negotiate an encapsulation mode for the packets. For example, initiator 102 and responder 104 can use the IPsec suite of protocols. A more specific embodiment of using IPsec is described below with respect to FIG. 2. FIG. 1 illustrates the negotiation of an encapsulation mode between initiator 102 and responder 104.

As shown in FIG. 1, initiator 102 sends a first message 108 that includes a security association (SA) payload with a proposal that includes a parameter indicating an encapsulation mode that will allow packets to be transmitted from initiator 102 to responder 104 without encapsulation. It should be understood that first message 108 is not necessarily limit to an SA payload but may in other embodiments be a different type of message that can carry the proposal. The SA payload may have any suitable structure. In one embodiment, the SA payload is structured as defined in The Internet IP Security Domain of Interpretation for ISAKMP, RFC 2407, which is hereby incorporated by reference. In addition to the above-noted proposal, in embodiments, the SA payload in message 108 will also include additional proposals with parameters for different encapsulation modes.

After initiator 102 sends message 108, responder 104 will send message 110 with a response selecting one of the proposals from message 108. In the embodiment shown in FIG. 1, the responder 104 has the proposal that includes the parameter indicating an encapsulation mode that will allow packets to be transmitted from initiator 102 to responder 104 without encapsulation. When initiator 102 receives message 110, it will determine which of the proposals responder 104 has selected.

In the embodiment illustrated in FIG. 1, the responder 104 selected the encapsulation mode that allows packets to be sent without encapsulation, which results in the initiator 102 sending any initial packets on a connection established between initiator 102 and responder 104 twice. As seen in FIG. 1, the first packet 112 is encapsulated and sent to the responder 104 and then the first packet 112a is sent without encapsulation. By sending the first packet 112 encapsulated, the responder 104 can establish a state with respect to the connection between initiator 102 and responder 104. That is, the encapsulated first packet 112 indicates to the responder 104 that the connection between initiator 102 and responder 104 is secure and that any subsequent messages sent on this connection can be considered secure. As a result, only subsequent packets that are sent on the established connection are allowed. As shown in FIG. 1, initiator 102 will resend packet 1 without encapsulation 112a to allow the intermediary 106 to process the packet. Any further packets, e.g., 116, will be sent without encapsulation. In some embodiments, in addition to responder 104, the intermediary 102 will also maintain a state regarding the connection between initiator 102 and responder 104.

System 100 thus allows a secure connection to be established between initiator 102 and responder 104. Also, because packets sent on connections between initiator 102 and responder 104 are not encapsulated, intermediary 106 can easily perform additional functions on the packets without requiring special modifications to process the packets. For example, in some embodiments, intermediary 106 performs packet inspection. The packet inspection can be for reasons such as filtering out potentially malicious packets or maintaining statistics on the packets transmitted and received by responder 104. As those with skill in the art will appreciate, if the packets are encapsulated, intermediary 106 must be specifically configured for inspecting the encapsulated packets. For example, encapsulated packets undergo changes, such as changes to the headers and trailers and/or encryption of portions of the packets. In order for intermediaries to inspect encapsulated packets they must be configured to know how the packet information is changed when encapsulated. In system 100, because the packets are being sent without encapsulation, special configurations are not necessary in order to inspect the packets.

As should be appreciated, in embodiments, if subsequent packets are sent from initiator 102 to responder 104 on a different connection (or an attempted connection) than the previously established connection, the packets will be dropped by responder 104. That is, the responder 104 keeps track of the state of the established connection and drops subsequent packets that are not sent on the established connection. Thus, if subsequent packets are sent from a different initiator to responder 104, the packets will also be dropped.

Figure 2:
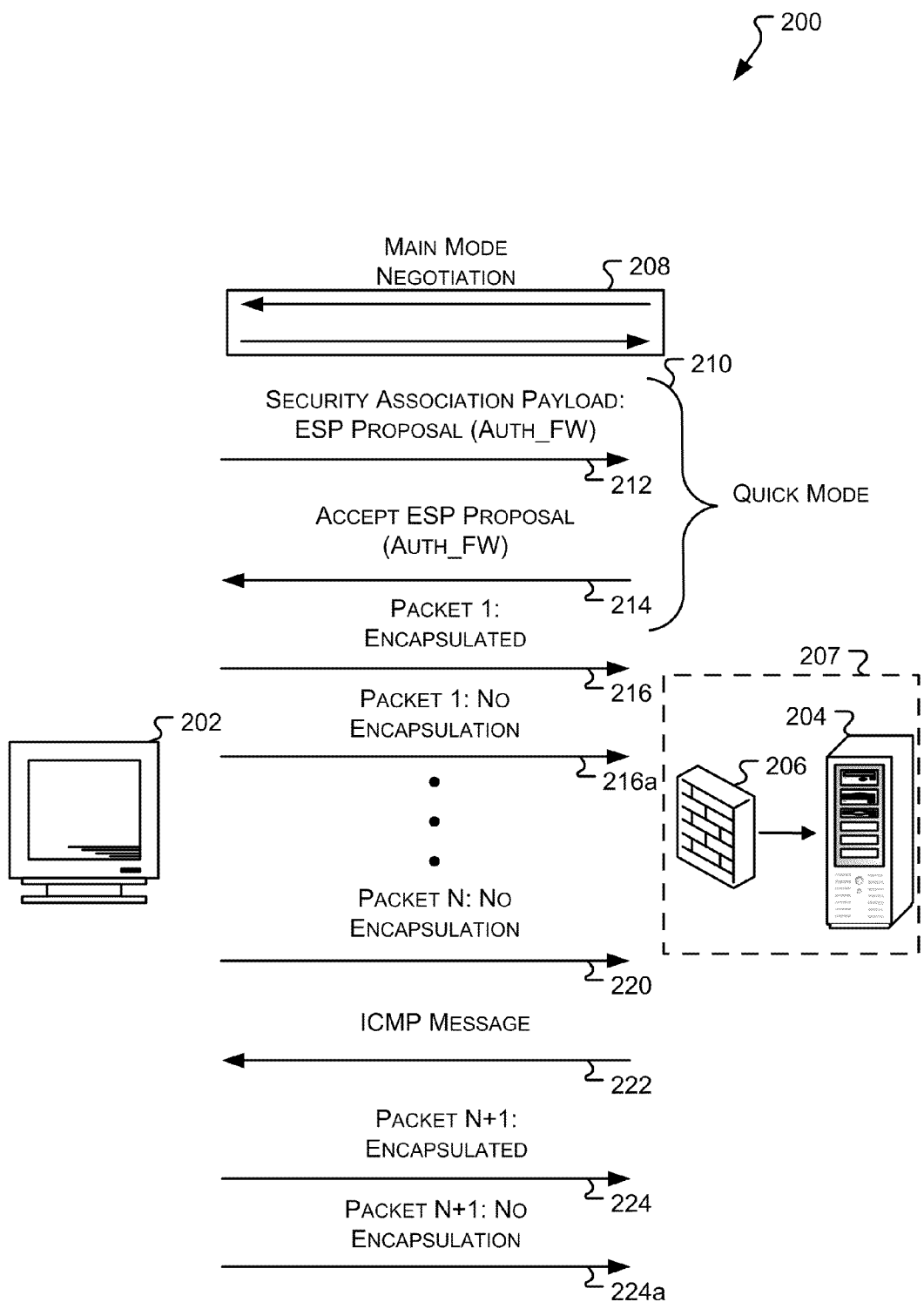
FIG. 2 illustrates a second system including an initiator and a responder that negotiate an encapsulation mode, according to an embodiment.

FIG. 2 shows a system 200 according to an embodiment, where a security association (SA) is established between an initiator 202 and a responder 204. Similar to system 100 (FIG. 1) system 200 includes an initiator 202, a responder 204, and an intermediary, which in system 200 is a firewall 206. As illustrated in FIG. 2, in embodiments, the responder 204 and the firewall 206 are located on the same machine 207, e.g., on the same server. In other embodiments, responder 204 and firewall 206 may be implemented on separate machines. System 200 illustrates the implementation of IPsec for securely sending packets from initiator 202 to responder 204. In embodiments, IPsec will be implemented using Authenticated Internet Protocol, however as those with skill in the art will appreciate, IPsec may in other embodiments be implemented using the Internet Key Exchange or other appropriate protocol.

First, initiator 202 engages in a main mode negotiation 208 with responder 204. The main mode negotiation 208 authenticates initiator 202 and responder 204 and creates a security association between the two. After the main mode negotiation 208, the initiator 202 and the responder 204 engage in a quick mode negotiation 210. As part of the quick mode negotiation 210, the initiator 202 and the responder 204 negotiate an encapsulation mode for encapsulating packets sent between the two. Quick mode negotiation 210 includes the initiator 202 sending message 208 with a SA payload. As those with skill the art will appreciate, the SA payload includes a number of proposals for encapsulating messages sent between the initiator 202 and the responder 204. For example, in some embodiments the proposals may involve the use of Authenticated Header (AH) or Encapsulation Security Payload (ESP). Each of the proposals may include a transform with a number of parameters. The transforms may include parameters for defining a specific hashing function used in encapsulating packets or a particular encapsulation mode such as transport or tunnel.

In the embodiment shown in FIG. 2, at least one of the proposals in the SA payload includes ESP with a transform parameter indicating a firewall encapsulation mode indicated as "Auth_FW" in FIG. 2. This proposal allows packets to be sent between initiator 202 and responder 204 without encapsulation. Again, as part of quick mode negotiation 210, responder 204 will send a message 214 that selects the ESP proposal with the firewall encapsulation mode.

After the quick mode negotiation 210 has ended, initiator 202 and responder 204 can establish a connection for sending packets. In accordance with the ESP proposal with the firewall encapsulation mode, negotiated during quick mode negotiation 210, when sending packets over a connection, initiator 202 will first send a "double packet." Sending the "double packet" essentially includes encapsulating and sending the first packet 216 and sending the first packet without encapsulation 216a. As noted above, sending the first packet 216 without encapsulation allows responder 204 to establish a state with respect to the connection between initiator 202 and responder 204. In other words, the first encapsulated packet indicates to the responder 204 that the connection established between initiator 202 and responder 204 are secure and any packets sent on the established connection can be safely allowed. The first packet without encapsulation 216a is sent so that it may be appropriately processed by firewall 206. Any subsequent packets, for example packet 220, can be sent without encapsulation. In one embodiment, the packets are actually sent in cleartext.

Responder 204 may maintain the state of the secure connection established with initiator 202 in any suitable way. In one embodiment, the state is maintained in a state table stored on responder 204. The state table stores the state of the connection between responder 204 and initiator 202 in association with a 5-tuple, e.g., local address, local port, remote address, remote port, and protocol. This is merely one example of how responder 204 may maintain the state of the secure connection and embodiments should not be limited to this specific example.

In system 200, because packets transmitted between initiator 202 and responder 204 are not encapsulated, firewall 206 can easily provide additional security features. For example, firewall 206 may provide for deep packet inspection of the packets transmitted between initiator 202 and responder 204 and as such be able to filter out packets that are potentially malicious. As noted before, if the packets were encapsulated, firewall 206 could not implement some of the security features or would have to be specially configured to be able to inspect the encapsulated packets. In system 200, firewall 206 could be configured normally and still be able to implement its security features. In some embodiments, firewall 206 will maintain a state regarding the connection between initiator 202 and responder 204.

In the embodiment shown in FIG. 2, the responder 204 may periodically send an Internet Control Message Protocol (ICMP) message 222 to the initiator 202. This message may be sent as a result of a timeout. For example, in one embodiment, system 200 may provide for a timeout on the sending of packets that are not encapsulated over connections between initiator 202 and responder 204. In this embodiment, after the timeout has expired, the responder 204 will request that the initiator 202 send a "double packet" as noted above. When the initiator 202 receives the ICMP message 222, it will send a double packet for the next packets sent on the connection. The double packet will include a first encapsulated packet 224 and a second packet 224a that is not encapsulated. Similar to the double packet (216 & 216a), the subsequent double packet allows the responder 204 to reestablish state for the connection between initiator 202 and responder 204. The initiator 202 can then continue to send packets that are not encapsulated to the responder 206.

In embodiments, initiator 202 (or another initiator) may attempt to send subsequent packets to responder 204 on other connections. As previously described, responder 204 maintains a state for the established connection between initiator 202 and responder 204. Any subsequent packet that is received by responder 204 that is not sent on the established connection will be dropped by responder 204. This prevents a malicious user that may spoof initiator 202 from sending packets to responder 204 on another connection and have the packets allowed by responder 204. Only packets received on the exact established connection will be accepted by responder 204. As noted above, responder 204 may use a state table to store the state of the established connection.

Figure 3:
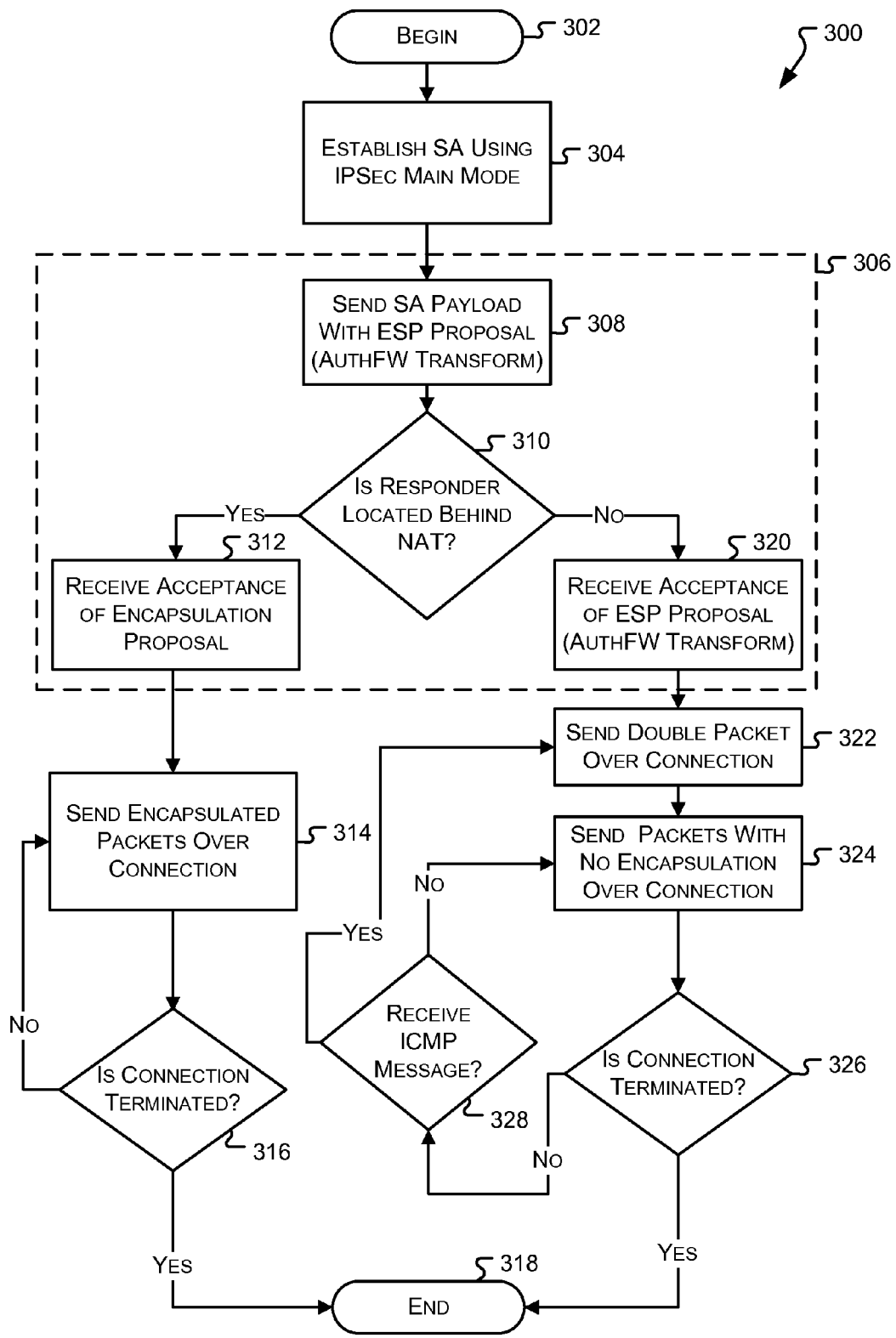
FIG. 3 illustrates an operational flow for establishing a security association and negotiating an encapsulation mode with a responder, according to an embodiment.
Figure 4:
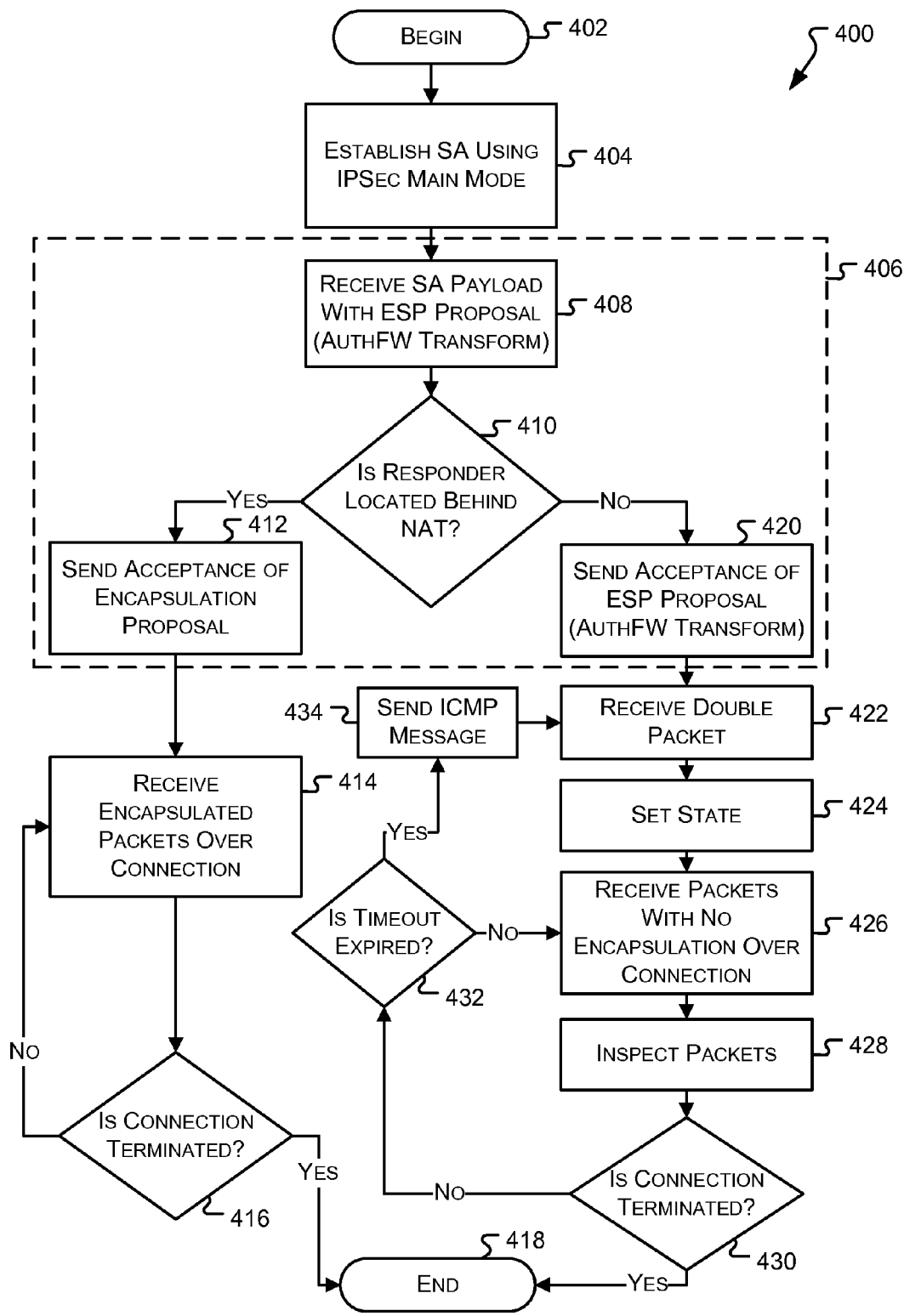
FIG. 4 illustrates a second operational flow for establishing a security association and negotiating an encapsulation mode with an initiator, according to another embodiment.

FIGS. 3 and 4 illustrate operational flows 300 and 400, according to embodiments. Operational flows 300 and 400 may be performed in any suitable environment. For example, the operational flows may be executed in systems such as illustrated in FIGS. 1 and 2. Therefore, the description of operational flows 300 and 400 may refer to at least one of the components of FIGS. 1 and 2. However, any such reference to components of FIGS. 1 and 2 is for descriptive purposes only, and it is to be understood that the implementations of FIGS. 1 and 2 are non-limiting environments for operational flows 300 and 400.

Furthermore, although operational flows 300 and 400 are illustrated and described sequentially in a particular order, in other embodiments, the operations may be performed in different orders, multiple times, and/or in parallel. Further, one or more operations may be omitted or combined in some embodiments.

FIG. 3 illustrates an operational flow 300 for establishing a security association and negotiating an encapsulation mode with a responder. In embodiments, flow 300 will be implemented by initiators 102 (FIG. 1) and 202 (FIG. 2). However, it should be understood that flow 300 is not limited to this specific embodiment.

Flow 300 begins at 302. At operation 304 a security association is established with a responder using IPSec Main Mode. Operation 304 may be implemented using any appropriate protocol such as Authenticated Internet Protocol or Internet Key Exchange. As those with skill in the art will appreciate, operation 304 requires a number of messages to be passed between the initiator and the responder. After operation 304, flow 300 passes to operation 306 where a Quick Mode negotiation occurs. Operation 306 includes a number of sub steps 308, 310, 312, and 320. At operation 308, a security association (SA) payload is sent with a number of proposals for encapsulating messages sent between the initiator and the responder. In embodiments, the proposals involve the use of Authenticated Header (AH) or Encapsulation Security Payload (ESP). Each of the proposals includes a transform with a number of parameters. The transforms may include parameters for defining a specific hashing function used in encapsulating packets or a particular encapsulation mode. One of the proposals in the SA payload includes ESP with a transform parameter indicating a firewall encapsulation mode indicated as "AuthFW." This proposal allows packets to be sent between the initiator and the responder without encapsulation.

Flow 300 passes to decision 310, where a determination is made as to whether or not the responder is located behind a Network Address Translator (NAT). When the responder is located behind a NAT, it becomes easier for a malicious user to spoof the responder, which creates an increased security risk. As a result, in some embodiments if the responder is located behind a NAT, the transform with the firewall encapsulation mode will not be accepted by the responder. In these embodiments, flow 300 will pass from decision 310 to operation 312 where an acceptance of a different encapsulation proposal is received.

At operation 314, the initiator will send encapsulated packets over the connection to the responder in accordance with the selected encapsulation proposal. From operation 314, flow 300 passes to decision 316 in which it is determined whether the connection between the initiator and the responder has been terminated. If the connection has not been terminated, flow passes to operation 314 where the initiator can continue to send encapsulated packets over the connection. If at decision 316 it is determined that the connection has been terminated, flow 300 ends at 318.

If at decision 310 a determination is made that the responder is not located behind a NAT, flow passes to operation 320 where an acceptance of the encapsulation proposal with the transform parameter indicating firewall encapsulation is received from the responder. After operation 320, the initiator sends a double packet. As indicated above, a double packet includes a first encapsulated packet and the same packet sent without encapsulation. The first encapsulated packet allows the responder to establish a state, e.g., that the connection between the initiator and the responder is secure and any packets sent on connections between the initiator and the responder should be allowed. The packet without encapsulation (sent as part of the double packet) is processed by the intermediary and the responder.

After operation 322, the initiator may continue to send packets without encapsulation at operation 324. As noted above, in some embodiments the packets may be sent in clear text. Flow 300 passes from operation 324 to decision 326 where a determination is made as to whether the connection between the initiator and the responder has been terminated. If the connection has not been terminated, flow passes to decision 328 where a determination is made as to whether an ICMP message has been received. If at decision 328 no ICMP message has been received flow 300 passes to 324, where the initiator can continue to send packets without encapsulation.

If at decision 328 a determination is made that an ICMP message has been received, flow passes to operation 322 where a double packet is sent over the connection. In embodiments the ICMP message includes a request from the responder to the initiator to send another double packet. The double packet will include a first encapsulated packet and the same packet without encapsulation. Flow 300 then passes again to operation 324 where the initiator can continue to send packets over the connection without encapsulation. After operation 324, flow passes to decision 326 where if it is determined that the connection has been terminated, flow 300 ends at 318.

FIG. 4 illustrates an operational flow 400 for establishing a security association and negotiating an encapsulation mode with an initiator. In embodiments, flow 300 will be implemented by responders 104 (FIG. 1) and 204 (FIG. 2). However, it should be understood that flow 400 is not limited to this specific embodiment.

Flow 400 begins at 402. At operation 404 a security association is established with an initiator using IPSec Main Mode. Operation 404 may be implemented using any appropriate protocol such as Authenticated Internet Protocol or Internet Key Exchange. Operation 404 requires a number of messages to be passed between the responder and the initiator. Flow 400 passes from operation 404 to operation 406 where a Quick Mode exchange between the responder in the initiator occurs. Operation 406 includes a number of sub steps 408, 410, 412, and 420. At operation 408, a security association (SA) payload is received by the responder with a number of proposals for encapsulating messages sent between the responder and the initiator. As noted above, in embodiments, the proposals involve the use of Authenticated Header (AH) or Encapsulation Security Payload (ESP). Each of the proposals includes a transform with a number of parameters. The transforms may include parameters for defining a specific hashing function used in encapsulating packets or a particular encapsulation mode. One of the proposals in the SA payload includes ESP with a transform parameter indicating a firewall encapsulation mode indicated as "AuthFW." This proposal allows packets to be sent between responder and initiator without encapsulation.

At decision 410, a determination is made as to whether the responder is located behind a Network Address Translator (NAT). When the responder is located behind a NAT, it becomes easier for a malicious user to spoof the responder, which creates an increased security risk. In some embodiments, if the responder is located behind a NAT, the transform with the firewall encapsulation mode will not be accepted by the responder. In these embodiments, flow will pass from decision 410 to operation 412 where an acceptance of a different encapsulation proposal is sent.

At operation 414, the responder will receive encapsulated packets over the connection in accordance with the selected encapsulation proposal. From operation 414, flow 400 passes to decision 416 in which it is determined whether the connection between the initiator and the responder has been terminated. If the connection has not been terminated, flow passes to operation 414 where the initiator can continue to send encapsulated over the connection. If at decision 416 it is determined that the connection has been terminated, flow 400 ends at 418.

As noted above, sending encapsulated packets over the connection makes implementing the additional features of an intermediary such as a firewall, which may be located at a responder, more cumbersome. Because the packets being sent are encapsulated, the intermediary must be specifically configured to work around the encapsulation of the packets which can sometimes be difficult fix. However, because having the responder behind a NAT poses an increased security risk, an administrator may still prefer to implement a fix instead of allowing packets to be sent without encapsulation.

If at decision 410 a determination is made that the responder is not located behind a NAT, flow passes to operation 420 where an acceptance of the encapsulation proposal with the transform parameter indicating firewall encapsulation is sent to the initiator. The responder receives a double packet at operation 422. A double packet includes a first encapsulated packet and the same packet resent without encapsulation. The first encapsulated packet allows the responder to establish a state, e.g., that the connection between the responder and the initiator is secure and any packets sent on connections between the responder and the initiator should be allowed. The packet without encapsulation (sent as part of the double packet) is processed by the intermediary and the responder.

In the embodiment illustrated in FIG. 4, the responder includes an intermediary, namely a firewall. As such, after the responder receives a double packet at operation 422, flow passes to operation 424 where the responder will set a state based on the first encapsulated packet received at operation 422. The state may indicate that a connection established between the responder and the initiator is secure and any packet sent on such a connection should be allowed.

After operation 424, the responder receives a number of packets without encapsulation at operation 426. As noted above, in some embodiments the packets are sent in cleartext. At operation 428, the firewall at the responder inspects the packets. Operation 428 may include in embodiments, deep packet inspection to filter out packets that may be malicious or may be spam. In other embodiments, operation 428 may involve merely monitoring packet traffic and maintaining statistics. After operation 428, flow 400 passes to decision 430 where a determination is made whether the connection has been terminated.

If the connection has not been terminated, flow passes to decision 432 where a determination is made as to whether a timeout has expired. The timeout is useful to guard against those situations in which a connection may be maintained for a very long period of time, even if not in use. If the timeout has not expired, flow passes back to operation 426 where the responder continues to receive packets with no encapsulation. However, if the timeout has expired, flow 400 passes to operation 434 where an ICMP message is sent to the initiator.

The ICMP message requests that the initiator send another double packet. At operation 422, a double packet is received. The double packet will include a first encapsulated packet and the same packet without encapsulation. Flow 400 then passes again to operation 424 where the responder may reestablish or reset a state. After operation 424, flow passes again to operation 426 were packets without encapsulation are received and then to operation 428 were the packets are inspected. If when flow 400 passes again to decision 430 and it is determined that the connection has been terminated, flow 400 ends at 418.

Figure 5:
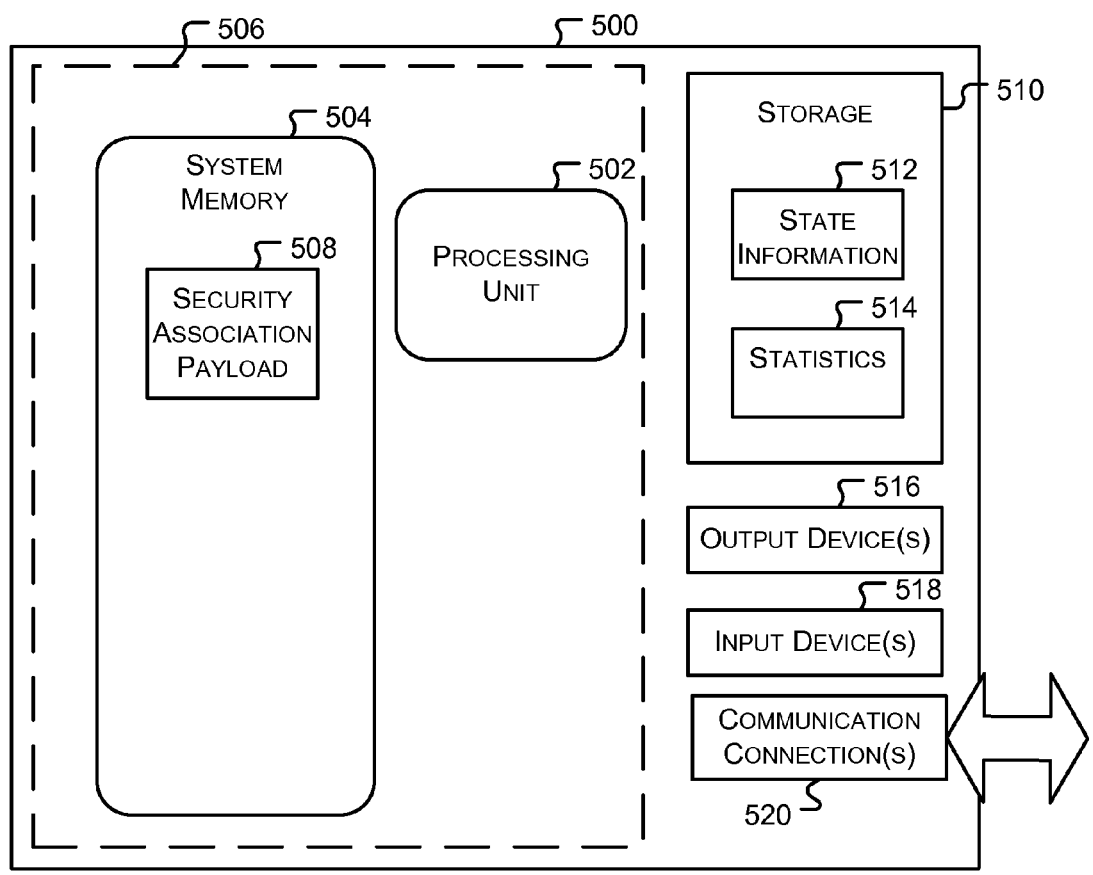
FIG. 5 illustrates a block diagram of a computing environment suitable for implementing embodiments.

FIG. 5 illustrates a general computer environment 500, which can be used to implement the embodiments described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the example computer environment 500.

In its most basic configuration, environment 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. As shown in FIG. 5, the Security Association payload 508 may be loaded into system memory 504 to be sent as part of a negotiation of encapsulation mode by environment 500. The Security Association payload 508 may be used when environment 500 is performing flow 300 or 400 described in FIG. 3 and FIG. 4.

Additionally, environment 50 may also have additional features/functionality. For example, environment 500 may also include additional storage 510 (removable and/or non-removable) including, but not limited to, magnetic or optical disks or tape. Such additional storage is illustrated in FIG. 5 by storage 510. As shown in FIG. 5, storage 510 may store state information 512 from a responder or an intermediary and statistics 514 generated by the intermediary by inspecting packets that are sent without encapsulation.

Computer storage media includes volatile and nonvolatile, removable and non-removable media implemented in any method or technology for storage of information such as computer readable instructions, data structures, program modules or other data. Memory 504 and storage 510 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by environment 500. Any such computer storage media may be part of environment 600.

System 500 may also contain communications connection(s) 520 that allow the system to communicate with other devices. Communications connection(s) 520 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Environment 500 may also have input device(s) 518 such as keyboard, mouse, pen, voice input device, touch input device, etc. Output device(s) 516 such as a display, speakers, printer, etc. may also be included. All these devices are well know in the art and need not be discussed at length here.

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems of the embodiments disclosed herein without departing from the scope of the claimed embodiments.

We claim:

1. A computer implemented method of negotiating an encapsulation of packets that are securely sent between an initiator and a responder, the method comprising:
   sending a first message from the initiator to the responder with a plurality of proposals for encapsulating packets sent on a connection established between the initiator and the responder, wherein a first one of the plurality of proposals comprises a parameter for allowing packets to be sent on the connection without encapsulation;
   receiving a second message from the responder indicating a selection of the at least one proposal;
   sending a first packet on a connection established between the initiator and the responder, wherein the first packet is encapsulated; and
   after sending the first packet, sending a plurality of packets on the connection established between the initiator and the responder, wherein the plurality of packets are not encapsulated;
   receiving an Internet Control Message Protocol (ICMP) message from the responder;
   encapsulating and sending one of the plurality of packets to the responder in response to receiving the ICMP packet; and
   resending the one of the plurality of packets without encapsulating to the responder.

2. The method of claim 1, wherein the first message comprises a Security Association (SA) payload.

3. The method of claim 2, wherein the plurality of proposals comprises Authentication Header (AH) and Encapsulation Security Payload (ESP).

4. The method of claim 3, wherein the parameter is an attribute of a transform of the at least one proposal and the selection comprises a selection of the transform of the at least one proposal.

5. The method of claim 1, wherein the plurality of packets are sent in cleartext.

6. The method of claim 1, wherein after the sending the first packet and before sending the plurality of packets, resending the first packet without encapsulation.

7. The method of claim 1, wherein if the responder is located behind a Network Address Translator (NAT) the second message from the responder indicates selection of a second one of the plurality of proposals.

8. The method of claim 1, wherein the steps are performed using one of the protocols selected from the group consisting of the Authenticated Internet Protocol and the Internet Key Exchange.

9. The method of claim 8, wherein the steps are performed as part of a Quick Mode negotiation.

10. One or more computer storage media, not consisting of a propagated data signal, the computer storage media storing computer executable instructions that when executed by one or more processors perform a method of implementing security for packets that are sent between an initiator and a responder, wherein an intermediary is located between the initiator and responder, the method comprising:
- receiving a first message with a Security Association (SA) payload from the initiator with a plurality of proposals for encapsulating packets sent on a connection established between the initiator and the responder, wherein at least one of the proposals comprises a transform with an encapsulation attribute for allowing packets to be sent on the connection without encapsulation;
- sending a second message to the initiator indicating a selection of the at least one proposal and the transform;
- receiving a first packet on the connection established between the initiator and the responder, wherein the first packet is encapsulated according to the at least one proposal;
- setting a state for the connection based on the encapsulated first packet;
- receiving the first packet without encapsulation; and
- receiving and allowing a plurality of packets on the connection established between the initiator and the responder, wherein the plurality of packets are not encapsulated.

11. The one or more computer storage media of claim 10, further comprising:
- sending an Internet Control Message Protocol (ICMP) message to the initiator requesting that the next packet be sent twice; and
- in response to sending the ICMP message:
  - receiving one of the plurality of packets encapsulated according to the at least one proposal; and
  - receiving the one of the plurality of packets without encapsulating to the responder.

12. The one or more computer storage media of claim 11, wherein the sending the ICMP message is performed in response to expiration of a timeout.

13. The one or more computer storage media of claim 11, wherein the intermediary state is reset based on the encapsulated one of the plurality of packets.

14. The one or more computer storage media of claim 10, wherein the method further comprises:
- receiving a subsequent packet;
- determining that the subsequent packet was sent on a second connection different from the connection established between the initiator and the responder; and
- dropping the subsequent packet.

15. The one or more computer storage media of claim 14, wherein the setting the state comprises storing the state in a state table and the determining that the subsequent packet was sent on a second connection comprises evaluating the state table.

16. A computer system for performing a method of implementing security for packets that are sent between an initiator and a responder, the system comprising:
- one or more computer storage media, not consisting of a propagated data signal, the computer storage media storing computer executable instructions that when executed perform a method comprising:
  - receiving a first message with a Security Association (SA) payload from the initiator with a plurality of proposals for encapsulating packets sent on a connection established between the initiator and the responder, wherein at least one of the proposals comprises Encapsulation Security Payload (ESP) with a transform that includes an encapsulation attribute indicating firewall encapsulation mode;
  - sending a second message to the initiator indicating a selection of the at least one proposal and the transform;
  - receiving a first packet on the connection established between the initiator and the responder, wherein the first packet is encapsulated according to ESP;
  - setting a firewall state based on the encapsulated first packet;
  - receiving the first packet without encapsulation; and
  - receiving a plurality of packets on the connection established between the initiator and the responder, wherein the plurality of packets are not encapsulated; and
  - inspecting the packets with the firewall; and
- one or more processors for executing the computer executable instructions.

17. The system of claim 16, further comprising:
- sending an Internet Control Message Protocol (ICMP) message to the initiator requesting that the next packet be sent twice; and
- in response to sending the ICMP message:
  - receiving one of the plurality of packets encapsulated according to ESP; and
  - receiving the one of the plurality of packets without encapsulation.

18. The system of claim 17, wherein the firewall state is reset based on the encapsulated one of the plurality of packets.

19. The system of claim 16, wherein the receiving a first message with a Security Association (SA) payload and the sending a second message to the initiator indicating a selection of the at least one proposal is performed as part of an Authenticated Internet Protocol Quick Mode negotiation.

\* \* \* \* \*